United States Patent [19]
Stockman

[11] 3,807,321
[45] Apr. 30, 1974

[54] CONTROLLED TEMPERATURE INCINERATOR

[75] Inventor: Richard F. Stockman, Friendship, N.Y.

[73] Assignee: The Air Preheater Company, Inc., Wellsville, N.Y.

[22] Filed: July 14, 1972

[21] Appl. No.: 271,842

[52] U.S. Cl............... 110/8 R, 110/8 A, 110/49 R, 110/72 B
[51] Int. Cl. ............................................. F23g 3/06
[58] Field of Search........ 110/8 A, 8 R, 49 R, 72 B, 110/119

[56] References Cited
UNITED STATES PATENTS

| | | | |
|---|---|---|---|
| 2,811,937 | 11/1957 | Bouchard........................ | 110/49 R |
| 3,491,707 | 1/1970 | Bakker............................... | 110/8 A |
| 2,875,736 | 3/1959 | Stallkamp........................ | 110/49 R |
| 3,499,400 | 3/1970 | Altmann............................ | 110/8 R |

Primary Examiner—Kenneth W. Sprague
Assistant Examiner—James C. Yeung
Attorney, Agent, or Firm—Wayne H. Lang

[57] ABSTRACT

Apparatus and method for the recovery of metallic constituents from scrap material that includes a mixture of organic and metallic values.

9 Claims, 1 Drawing Figure

PATENTED APR 30 1974 3,807,321
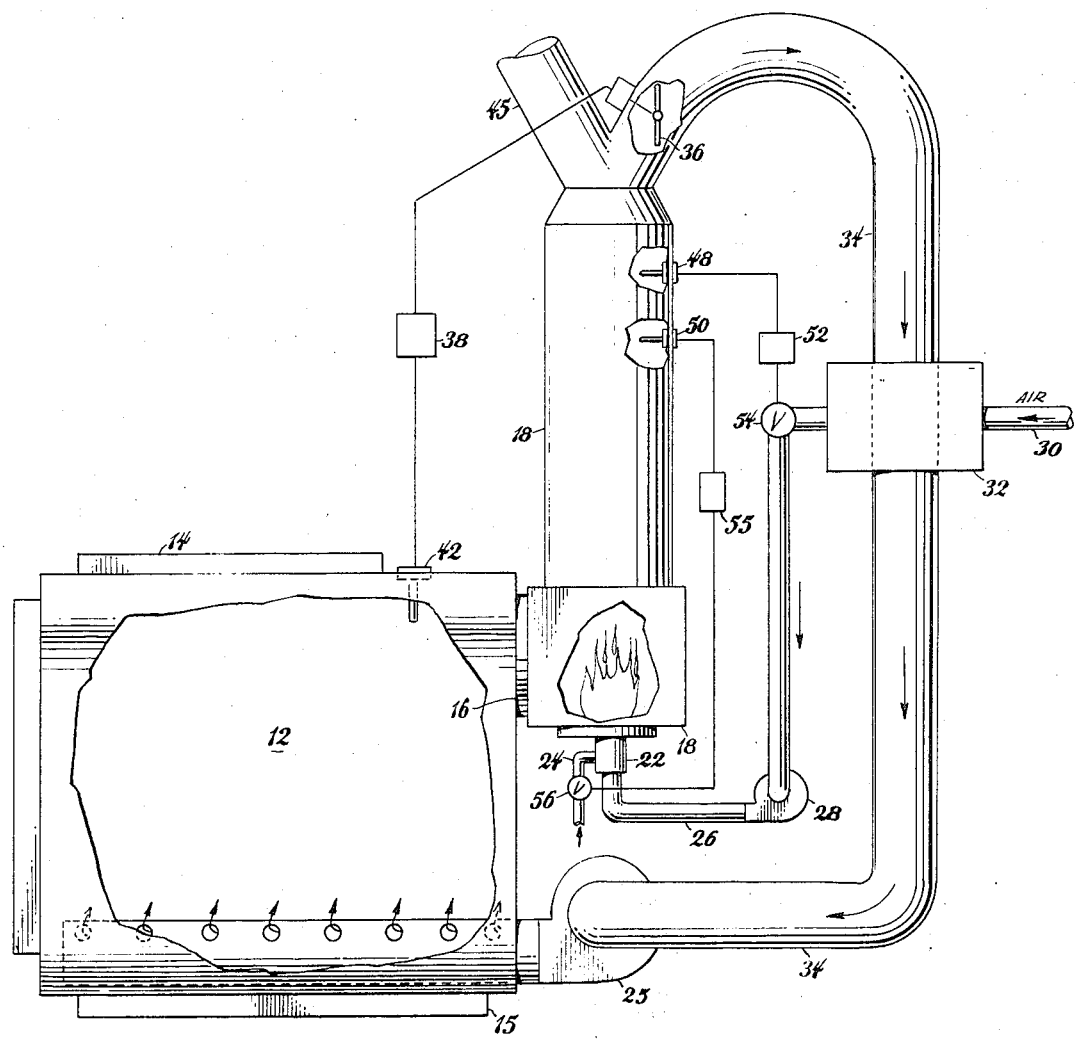

CONTROLLED TEMPERATURE INCINERATOR

BACKGROUND OF THE INVENTION

1. Field of the Invention

This invention relates to a method and apparatus used for the recovery of metallic components from metal bearing scrap such as foil-backed paper, printed circuit boards and plastic coated wire.

2. Description of Prior Art

Incinerators for the combustion of organic components in scrap material containing a metallic base have long been utilized as a principle means for reducing the metal to a basic form whereby it may be used again. The salvaging of metallic components from a scrap presents problems not common for the complete incineration of organic waste because the high temperatures necessary for the elimination of the organic components melt, excessively oxidize, vaporize or otherwise damage the metal constituents of the scrap.

Various arrangements, an example of which is illustrated by U. S. Pat. No. 3,636,873 have been developed wherein the scrap is initially heated by direct contact with a forced draft burner flame but is then quickly blown away to the cooler outer periphery of a combustion chamber that is maintained at a temperature well below the temperature at which the metals are harmed. Thus the scrap is not heated to an excessively high temperature that would damage its metallic content.

Although a device of the type defined is theoretically effective, its operation is extremely critical and it has been found that satisfactory operation is highly dependent upon obtaining a specific workable relationship between the supply of oxygen for combustion, the type and amount of waste involved, the size and angle of the forced draft burner, and the size and disposition of the chamber in which the burner is located.

Accordingly, even though such apparatus may operate effectively, continuous satisfactory operation from a practical standpoint remains difficult to attain.

SUMMARY OF THE INVENTION

The present invention is therefore directed to an incinerator and its method of operation whereby waste material having a significant content of metal scrap together with a quantity of organic waste may be incinerated by a controlled process that burns the organic waste without melting the metal, producing excess metallic vapors, or producing undesirable metallic oxides.

A more complete understanding of my invention may be realized by referring to the following description when read in conjunction with the accompanying drawing in which the single FIGURE is a schematic side elevation of an incinerator arrangement involving my invention.

DESCRIPTION OF THE PREFERRED EMBODIMENT

In the drawings the incinerator comprises a housing enclosing a chamber 12 having a loading opening 14, an ash clean-out door 15 and a gas outlet 16 whereby gas produced therein may be exhausted to an afterburner chamber 18. The chamber 18 contains an afterburner 22 having a supply for fuel 24 and a supply for air 26 that is provided by a fan 28. The suction port of fan 28 is connected to passageway 30 containing air that is first circulated through a heat exchanger 32 over duct 34 that contains hot gas exhausting from afterburner chamber 18 whereby air for combustion in afterburner 22 is significantly heated before it is supplied thereto.

Inasmuch as controller 52 responding to thermocouple 48 is adapted to control valve 54, a supply of air to afterburner 22 sufficient to maintain the temperature in chamber 18 at from 1,600° F. 1,800° F. be controlled by a proper setting of the controller. Thus, as the temperature in chamber 18 is maintained near its set-point, combustion of organic matter from the afterburner is so complete that the exhaust gas contains chiefly carbon dioxide, water vapor, metallic oxides, a small quantity of oxygen usually in the amount of 8 – 12%, and minute quantities of carbon monoxide.

Inasmuch as the exhaust gas contains sufficient oxygen to pyrolyze all organic matter in chamber 12, the exhaust gases from chamber 18 are recirculated to make use of the oxygen therein for the pyrolyzation of all raw waste, no other source of air to chamber 12 is provided.

Thus the exhaust gas from afterburner chamber 18 is directed back through duct 34 to the primary combustion chamber 12. In order that a sufficient amount of exhaust gas including oxygen therein is returned to chamber 12, a damper 36 directing the recirculation of exhaust gases is actuated by a controller 38 which is responsive to a thermocouple 42 in chamber 12. The controller 38 is set to maintain the temperature in chamber 12 at from 700° to 1,000° F., a temperature well below the melting point of most metals or the temperature at which said metals freely oxidize. Thus a temperature in chamber 12 below the set-point of 700° to 1,000° F. would call for an increased rate of combustion. To provide such an increase, damper 36 would be moved toward an open position to allow an increased flow of exhaust gas containing oxygen into chamber 12. An increase of temperature in chamber 12 would be similarly sensed by thermocouple 42. Controller 38 responsive to thermocouple 42 would close damper 36 to accordingly reduce the flow of oxygen, the rate of combustion and the temperature in chamber 12 to meet the set-point temperature. Exhaust gas containing oxygen exhausted from the afterburner chamber 18, not needed for combustion in chamber 12, would be vented to the atmosphere through a duct 45.

A thermocouple 48 in afterburner chamber 18 acting through a controller 52 maintains the flow of oxygen to the afterburner 22 at sufficient levels to insure the burning of all combustibles in the exhaust gas being exhausted from chamber 12. A valve 54 in air supply passageway 30 is therefore moved toward an "open" or "closed" position in accordance with the temperature in chamber 18 sensed by thermocouple 48 and controller 52, usually set at from 1,600° to 1,800° F.

A thermocouple 50 in afterburner chamber 18 acting through a controller 55 maintains the flow of fuel traversing valve 56 in line 24 to the afterburner 22 in such a manner that the valve 56 gradually opens or closes until its set-point is reached. Thus at a predetermined setting of controller 55, as for example 1,600° F., the valve 56 closes completely so that no supplementary fuel is being added thereto and only gas exhausting from chamber 12 is being burned in the afterburner. However, if the temperature in afterburner chamber 18 should drop below the set-point, valve 56 would be opened to permit supplementary fuel to flow to the afterburner 22.

In operation, chamber 12 is at first loaded with metal-bearing scrap through a charging door 14. Air valve 54 is partially opened to permit air from inlet 30 to be supplied to afterburner 22 and afterburner chamber 18. Inasmuch as there is at first no combustion in chamber 12, and the gas exhausting therefrom is cool, damper valve 36 in duct 34 is wide-open as determined by controller 38 and thermocouple 42 to permit recirculated air from chamber 18 to be supplied by fan 25 to chamber 12. When air sufficient for combustion is available, the charge is lighted manually or by an automatic means (not shown) and combustion in chamber 12 is thus effected, the temperature in chamber 12 rises, and damper 36 accordingly moves toward its "closed" position.

As partial combustion or pyrolyzation of the waste material in chamber 12 is effected, exhaust gases given off therefrom pass to chamber 18 whereby they are mixed with oxygen from inlet 26 and burned in afterburner 22.

When the temperature increases in afterburner chamber 18, the airflow through valve 54 is also increased by controller 52 in accordance with thermocouple 48 commensurate with the flow capacity of the stack 45 so that "excess" or cooling air is flowing therethrough. As additional waste material in chamber 12 is subjected to pyrolytic action, more hot gases are given off through exhaust duct 16 to pass to the afterburner chamber 18 where they, along with fuel from source 24 and air being delivered through duct 26, are subjected to the temperature of combustion so that the temperature continues to climb. Additional fuel is added to the afterburner 22 until controller 55 reaches a predetermined set-point of approximately 1,800° F. as determined by thermocouple 50 in chamber 18. At this point valve 56 moves to a closed position to shut off the quantity of fuel flowing to the afterburner through duct 24. When the temperature in chamber 18 falls below its set-point, the valve 56 again is moved towards its open position to permit a flow of fuel to the afterburner 22 to compensate for the diminishing flow of pyrolyzed gas from chamber 12 whereby the temperature in the afterburner chamber may be maintained at approximately 1,800° F.

Inasmuch as hot exhaust gas in afterburner chamber 18 contains a small amount of oxygen, this exhaust gas alone is recirculated to chamber 12 to provide all the oxygen for pyrolysis of the waste in chamber 12 at a rate determined by thermocouple 42. Thus a low temperature in chamber 12 below the set-point (approximately 900° F.), damper 36 will be moved to "open" to allow more oxygen to be supplied via duct 34 to chamber 12. As the temperature therein builds up to 900° F., the damper 36 closes and all excess gas is exhausted to the atmosphere through duct 45.

Since the metal-bearing waste in chamber 12 is subjected to oxygen in an amount that supports only partial combustion of the waste, the oxidation of the metal is practically eliminated and the temperature is held below that at which the metal vaporizes or melts into a molten mass. However, the temperature within afterburner chamber 18 is at all times maintained sufficiently high to insure the complete incineration of gases given off from chamber 12.

Various other temperature ranges for the main chamber and the afterburner chamber may be maintained to properly reduce different types of scrap material by adjusting the controllers 38 and 52, and various other arrangements having a pyrolyzing chamber that uses exhaust gases alone for a source of oxygen may be utilized without departing from the spirit of the invention. Thus the foregoing descriptive matter including the drawing shall be interpreted as illustrative of the invention rather than as limiting the scope of the appended claims.

I claim:

1. Apparatus for the incineration of waste material having organic and inorganic values comprising a housing enclosing a pyrolyzing chamber with a loading port for the charging of waste therein and an outlet port for the flow of exhaust gases therefrom, an afterburner chamber having an inlet port connected to the outlet port of the pyrolyzing chamber and an exhaust duct directing exhaust gas from the afterburner chamber to the atmosphere, an afterburner mounted in the afterburner chamber, an inlet duct for the supply of air to the afterburner, and a return duct extending from the exhaust duct to the pyrolyzing chamber to supply exhaust gas including residual oxygen therein for the controlled pyrolysis of waste material in the pyrolyzing chamber.

2. Apparatus for the incineration of waste material as defined in claim 1 including means for cooling the gas exhausting from the afterburner before it is supplied to the pyrolyzing chamber.

3. Apparatus for the incineration of waste material as defined in claim 2 including damper means in the return duct controlling the flow of hot exhaust gas from the afterburner back to the pyrolyzing chamber.

4. Apparatus for the incineration of waste material as defined in claim 3 including a thermocouple responsive to temperature in the pyrolyzing chamber, and control means responsive to said thermocouple controlling movement of the damper in the duct that directs hot exhaust gas back to the incinerator.

5. Apparatus for the incineration of waste material as defined in claim 4 wherein the means responsive to the thermocouple in the pyrolyzing chamber is adapted to control the damper to provide a flow of exhaust gas containing sufficient air to maintain the pyrolyzing chamber at a temperature that does not exceed 1,000° F.

6. Apparatus for the incineration of waste material as defined in claim 1 including a heat exchanger interposed in the duct exhausting gas from the afterburner to the housing, and means directing the air for combustion in the afterburner through said heat exchanger in heat exchange relation with the exhaust gas from the afterburner.

7. Apparatus for the incineration of waste material as defined in claim 1 including temperature responsive means in the afterburner chamber, a valve for the control of air in the air inlet duct to the afterburner, and means responsive to the temperature responsive means controlling the flow of air through said valve whereby the temperature in the afterburner is maintained at a predetermined level.

8. Apparatus for the incineration of waste material as defined in claim 7 wherein the means in the independent duct is adapted to preclude the flow of fuel therethrough when the temperature at the second temperature responsive means exceeds 1,800° F.

9. Apparatus for the incineration of waste material as defined in claim 8 including an independent duct to said afterburner for the supply of fuel thereto, a second temperature responsive means in the afterburner chamber, and means in said independent duct responsive to the second temperature responsive means to limit the flow of fuel therethrough.

* * * * *